United States Patent Office 3,639,442
Patented Feb. 1, 1972

3,639,442
PREPARATION OF ORGANIC ISOCYANATES FROM ISOCYANIDE DIHALIDES
Dieter Arlt, Cologne-Buchheim, Germany, assignor to Farbenfabriken Bayer Aktiengesellschaft, Leverkusen, Germany
No Drawing. Filed July 3, 1968, Ser. No. 742,172
Claims priority, application Germany, July 6, 1967, P 16 43 975.1
Int. Cl. C07c 119/04
U.S. Cl. 260—453 P
4 Claims

ABSTRACT OF THE DISCLOSURE

Organic isocyanates are produced by reacting organic isocyanide dihalides with anhydrous strong acids containing dissociable hydrogen attached to oxygen. The isocyanates produced are useful in the preparation of insecticides, coatings, adhesives, films, fibers, foams, elastomers and the like.

---

This invention relates to organic monoisocyanates and polyisocyanates. More particularly, this invention relates to a process for the production of organic monoisocyanates and polyisocyanates which avoids the use of phosgene.

A wide variety of processes are known for the production of organic isocyanates. The process in most general use, however, is that of phosgenation of primary amines. The use of phosgene, however, is hazardous and phosgene is poisonous. In addition, however, other methods not requiring phosgene are known for the preparation of organic isocyanates including, for example, the Curtius rearrangement of acid azides as well as the Hofmann and Lossen rearrangements. Moreover, it is known to thermally decompose carbamates and ureas to form the corresponding isocyanate. Still another method of preparing isocyanate while avoiding the use of phosgene is to react an N,N'-disubstituted or trisubstituted urea with a relatively high boiling isocyanate. The latter process results in the isocyanate separating out and leaving the organic radical of the starting material on the urea. This process, however, suffers from the disadvantage that the ureas are not very soluble in the isocyanates so that large excesses of the isocyanate initially employed are required. It has also been disclosed that isocyanide dichlorides can be reacted with carboxylic acid anhydrides to form isocyanates; Angew. Chemie, 77, 1031 (1965). Unfortunately this reaction results only in moderate yields of isocyanates. It is desirable to have a process for the production of isocyanates which avoids the use of phosgene because some of the amines have other phosgene sensitive groups in the molecule. Furthermore not all isocyanates are obtainable by the phosgenation of amines. It is also desirable to have a process for the production of isocyanates yielding relatively high yields of isocyanates in addition to avoiding the use of phosgene.

It is, therefore, an object of this invention to provide a process for the preparation of organic isocyanates which avoids the use of phosgene. A further object of this invention is to provide a process for the preparation of isocyanates having improved yields. A further additional object of this invention is to provide a process for the preparation of organic isocyanates from organic isocyanide dihalides. A still further object of this invention is to provide a process for the preparation of organic isocyanates from organic isocyanide dihalides having high yields of isocyanates. Another still further additional object of this invention is to provide a process for the production of organic isocyanates which find use in the field of plastics and resins.

The foregoing objects and others which will become apparent from the following description are accomplished in accordance with the invention, generally speaking, by providing a process for the production of organic isocyanates wherein an organic isocyanide dihalide is reacted with an anhydrous strong acid containing dissociable hydrogen attached to oxygen. More particularly, the objects of this invention are accomplished by preparing organic isocyanates by reacting isocyanide dihalides with anhydrous strong acid containing dissociable hydrogen attached to oxygen and heating the reaction product.

The novel, chemically unique process of this invention comprises reacting an organic isocyanide with an anhydrous strong acid in which the hydrogen atom or atoms are attached to oxygen, the reaction proceeding in accordance with the following reaction sequence:

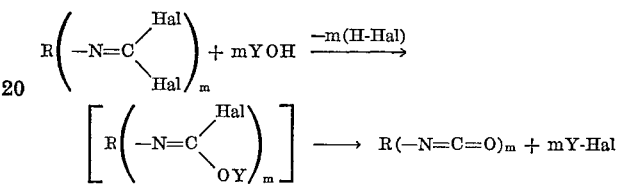

wherein R is an m-valent organic radical, Hal is a halogen atom, Y is the radical of a strong acid and $m$ is a whole number of at least 1. Although the intermediate reaction product shown in brackets may be separated and collected, if desired, this is generally not done since the organic isocyanate is generally the most desired end product. In the process of this invention the strong acid is converted into an acid halide which, if desired, may be converted back into the acid by reaction with water.

The process of this invention is suitable for the production of any organic mono- or polyisocyanate of the formula

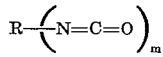

from isocyanide dihalides of the formula

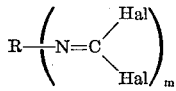

wherein R is an m-valent organic radical, Hal is a halogen atom and m is an integer of at least 1, preferably 1 or 2. In the formulae, R may be any suitable organic radical such as, for example, a substituted or unsubstituted, saturated or unsaturated organic radical selected from the group consisting of an aliphatic, cycloaliphatic, araliphatic, aromatic or heterocyclic radical which may be substituted with any suitable substituent which is non-reactive with an isocyanato group or with the strong acid reactant such as, for example, halo-, nitro- and the like. Preferably R is an m-valent substituted or unsubstituted aliphatic radical such as alkyl, alkenyl, alkynyl, cycloalkyl-alkyl, cycloalkenyl-alkyl, aralkyl, aralkenyl, aralkynyl and the like; a cycloaliphatic radical such as cycloalkyl, cycloalkenyl, alkylcycloalkyl, alkylcycloalkenyl, arylcycloalkyl, arylcycloalkenyl and the like; an aromatic radical such as aryl, alkaryl, alkenylaryl, alkynylaryl, cycloalkyl-aryl, cycloalkenyl-aryl and the like; a heterocyclic radical or a hydrocarbon substituted heterocyclic radical. Most preferably, however, R is an $m$-valent organic radical selected from the group consisting of alkyl or alkenyl having from 1 to 15 carbon atoms, cycloalkyl having up to 12 carbon atoms, preferably 5 or 6 carbon atoms, benzyl, phenyl, naphthyl, toluyl, diphenyl alkane having from 1 to 4 carbon atoms in the alkane moiety and the chloro-, bromo-, fluoro or nitro substituted derivatives thereof. Although $m$ may be any suitable whole number of at least 1 such as, for example, 1, 2, 3, 4 and the like, $m$ is preferably 1 or 2. Any of the suitable isocyanide dihalides may be used as reactants in the process of this invention but preferably the dichloride, dibromide or difluoride and most preferably the dichloride is employed. Thus Hal may be any suitable halogen atom such as, for example, fluorine, chlorine, bromine or the like, preferably chlorine.

Although organic isocyanates may be prepared from any of the corresponding organic isocyanide dihalides within the scope of the formula set forth above, the following may be mentioned as examples of suitable isocyanide dihalide reactants: saturated and unsaturated, optionally substituted aliphatic isocyanide dihalides such as methyl-, ethyl-, butyl- and dodecylisocyanide dichlorides and dibromides, 2-chloroethyl isocyanide dichloride, 2-chloroisopropyl isocyanide dichloride, 1-chloromethylpropyl isocyanide dichloride, 1-chloromethylallyl isocyanide dichloride, 4-chlorobuten-2-yl-isocyanide dichloride and the like, optionally substituted cycloaliphatic isocyanide dihalides such as, cyclohexyl- and 2-chlorocyclohexyl isocyanide dichlorides and difluorides; optionally substituted araliphatic and aromatic isocyanide dihalides such as benzyl isocyanide dichloride, phenyl isocyanide dichloride, dibromide and difluoride, 2,4-dichlorophenyl isocyanide dichloride, 2,4-difluorophenyl isocyanide dichloride, 2,4-dibromophenyl isocyanide dichloride, 3-nitrophenyl isocyanide dichloride and the like. Polyisocyanide dihalides such as, for example, 1,3- and 1,4-bis-phenylene isocyanide dichloride, 1,6-hexamethyl-bis-isocyanide dichloride, diphenyl methane-4,4-bis-isocyanide dichloride, 1,4-buten-2-bis-isocyanide dichloride, 2,4- and 2,6-toluylene-bis-isocyanide dichloride and dibromides and their isomeric mixtures and hydrogenation product may also be converted to the corresponding polyisocyanates according to the process of this invention.

Any suitable anhydrous strong acid containing dissociable hydrogen attached to oxygen may be used according to the process of this invention such as, for example, those corresponding to the formula $$YOH$$

wherein Y is the radical of a strong acid with a dissociation constant of at least $3.3 \times 10^{-2}$. As examples of suitable strong acids there may be mentioned aliphatic and aromatic sulphonic acids such as, for example, methane sulphonic acid, chloro methane sulphonic acid, benzene sulphonic acid, dodecyl benzene sulphonic acid and the like, aliphatic and aromatic phosphonic acids and the like, strong carboxylic acids such as, for example, dichloroacetic acid, trichloroacetic acid, trifluoroacetic acid and the like, inorganic acids such as halosulphonic acids and the like, examples of which are chlorosulphonic acid and fluorosulphonic acid as well as halophosphonic acids.

It is of particular advantage and thus a preferred embodiment of this invention to prepare the strong acid reactant used for the reaction in situ from water and an acid halide. In such a case, the acid halide in addition to the isocyanate may be recovered upon completion of the reaction according to the reaction scheme set forth above. As an example of this embodiment of the invention there is mentioned a mixture of phosphorus oxychloride and water, which results in particularly high isocyanate yields in the reaction with isocyanide dihalides. Generally it is advantageous to the use one equivalent of the anhydrous strong acid per isocyanide dihalide group; of course, it is possible to use an excess of strong acid or less than the equivalent amount of strong acid though it is preferred to use one equivalent of anhydrous strong acid per isocyanide dihalide group.

Although the reaction may be carried out in the absence of a solvent, the reaction may be and generally is carried out in the presence of an inert organic diluent. Any suitable inert organic diluent may be employed such as, for example, toluene, xylene, carbon tetrachloride, tetraline, dichlorobenzene, trichlorobenzene and the like. In the preferred embodiment of the invention wherein the anhydrous strong acid is prepared in situ from water and an acid halide, excess halide such as, for example, phosphorus oxychloride may be employed as a diluent.

Generally, the temperature at which the reaction of isocyanide dihalide and anhydrous strong acid is carried out is initially kept within the range of from about 10° C. to about 60° C. Afterwards, the reaction mixture is then heated at an elevated temperature, usually at a temperature up to about 250° C. where, as a result, the intermediate reaction product is split to give the isocyanate and acid halide. The isocyanate end product may be separated from the acid halide and from the diluent where used, by any suitable known separation procedure such as, for example, by fractional distillation. In such a case, the temperature at the base of the column is generally in excess of 100° C.

The isocyanates obtained by the process of this invention are useful where isocyanates of this type have been used heretofore, particularly as insecticides and coatings and adhesives and as agents for the treating of textiles as well as intermediates for the production of polyurethanes in the form of elastomers, foams, films, fibers and the like by the reaction of the isocyanates with active hydrogen containing compounds according to procedures known in the art such as, for example, according to U.S. Pats. Nos. Re. 24,514; 2,729,618 and 2,948,691 and the like.

The invention is further illustrated but is not intended to be limited by the following examples in which all parts and percentages are by weight unless otherwise specified.

EXAMPLE 1

About 107 parts (0.5 mol) of 2-chlorocyclohexyl isocyanide dichloride are dissolved in about 200 ml. of dichlorobenzene. About 48 parts (0.5 mol) of methane sulphonic acid are added dropwise with stirring at about 20° C., hydrogen chloride being given off as the reaction mixture becomes hotter. The mixture is heated for about 15 minutes at about 150° C. and then subjected to fractional distillation in vacuo. About 66 parts (82% of the theoretical) of 2-chlorocyclohexyl isocyanate, boiling at 94°–97° C./13 mm. Hg. are obtained.

NCO content.—Calculated, 26.4%; found, 26.1%.

EXAMPLE 2

About 174.5 parts (1 mol) of 2-chloroisopropyl isocyanide dichloride are dissolved in about 300 ml. of trichlorobenzene. About 116 parts (1 mol) of chlorosulphonic acid are added dropwise to the resulting solution as it is cooled to a temperature of about 10° to about 20° C. The temperature is increased, ultimately to about 220° C., resulting in the evolution of hydrogen chloride, chlorine and sulphur dioxide. About 84.5 parts (71% of the theoretical) of 2-chloroisopropyl isocyanate are distilled off at a head temperature of about 142°–145° C.

NCO content.—Calculated, 35.2%. Found 32.5%.

EXAMPLE 3

About 48 parts (0.5 mol) of methane sulphonic acid are added dropwise at about 20° C. to a solution of about 93 parts (0.5 mol) of 4-chlorobuten-2-yl isocyanide dichloride in about 200 ml. of dichlorobenzene. The reaction mixture undergoes spontaneous heating, hydrogen chloride being given off. It is then heated for about 10 minutes at about 150° C.; after which the mixture of isocyanate, methane sulphonic acid chloride and dichlorobenzene is distilled off in vacuo. About 50 parts (77% of the theoretical) of 4-chlorobutenyl-2-isocyanate boiling at 78°–79° C./13 torr are obtained from the distillate by fractional distillation.

NCO content.—Calculated, 32.0%; found 31.4%.

EXAMPLE 4

About 107 parts (0.5 mol) of 2-chlorocyclohexyl isocyanide dichloride are added dropwise at about 20° C. to a solution of about 82 parts (0.5 mol) of trichloroacetic acid in about 300 ml. of dichlorobenzene. The temperature is then gradually increased to about 150° C., resulting in the evolution of hydrogen chloride. Trichloroacetyl chloride and fractions of the solvent are distilled off. The residual mixture is subjected to fractional distillation. About 41 parts (51% of the theoretical) of 2-chlorocyclohexyl isocyanate boiling at 93°–98° C./13 torr are obtained.

EXAMPLE 5

About 122 parts (0.5 mol) of 2,4-dichlorophenyl isocyanide dichloride dissolved in about 350 ml. of dichlorobenzene are reacted at about 10° to about 30° C. with about 58 parts (0.5 mol) of chlorosulphonic acid. The reaction mixture is then heated for about 1 hour at about 130° C. and subjected to fractional distillation in vacuo. About 81 parts (86% of the theoretical) of 2,4-dichlorophenyl isocyanate boiling at 110°–116° C./14 torr are obtained.

NCO content.—Calculated, 17.3%; found, 16.9%.

EXAMPLE 6

About 9 parts (0.5 mol) of water are added dropwise to about 300 ml. of phosphorus oxychloride as it is cooled to about 20° C., followed by the addition of about 94.5 parts (0.5 mol) of 1-chloromethylpropyl isocyanide dichloride. The reaction mixture is briefly heated at about 100° C. and then fractionated in vacuo. About 63 parts (94% of the theoretical) of 1-chloromethylpropyl isocyanate boiling at 67° C./20 torr are obtained.

NCO content.—Calculated, 31.4%; found, 31.0%.

EXAMPLE 7

About 18.3 parts of phenylene-bis-isocyanide dichloride are suspended in about 100 ml. of chlorobenzene. About 13 parts of methane sulphonic acid are added at about 20° C., resulting in solution of the isocyanide dichloride, accompanied by the evolution of hydrogen chloride. The solution is fractionated in vacuo, giving about 5.9 parts (54% of the theoretical) of benzene-1,4-diisocyanate boiling at 106°–109° C./12 torr.

NCO content.—Calculated, 52.5%; found, 51.5%.

EXAMPLE 8

About 39 parts of phenyl isocyanide difluoride are dissolved in about 70 ml. of trichlorobenzene and about 27 parts of methane sulphonic acid are added dropwise to the resulting solution of about 20° C. The hydrogen fluoride formed is removed in vacuo, after which the reaction mixture is distilled in vacuo and then fractionated in vacuo through a Vigreux column. About 20 parts (61% of the theoretical) of phenyl isocyanate, boiling at 54°–57° C./15 torr are obtained.

NCO content.—Calculated, 35.3%; found, 34.9%.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A process for the production of organic isocyanates comprising reacting an organic isocyanide dihalide having the formula

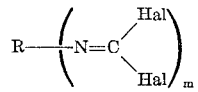

wherein R represents an m-valent radical selected from the group consisting of $C_1$ to $C_{15}$ alkyl, up to $C_{15}$ alkenyl, up to $C_{12}$ cycloalkyl, benzyl, phenyl, naphthyl, toluyl, and diphenylalkane, the alkane moiety containing up to 4 carbon atoms, which radical R may also be substituted by chloro-, bromo-, fluoro- or nitro-groups, Hal is a halogen atom and $m$ is an integer of 1 to 4, with an anhydrous strong acid containing dissociable hydrogen attached to oxygen said acid having a dissociation constant of at least $3.3 \times 10^{-2}$ selected from the group consisting of aliphatic sulphonic acids, aromatic sulphonic acids, aliphatic phosphonic acids, aromatic phosphonic acids, trichloroacetic acid, trifluoroacetic acid, halophosphonic acids, and halosulphonic acids and heating the reaction mixture to a temperature up to about 250° C.

2. The process of claim 1 wherein the reaction is conducted in the presence of an inert organic diluent.

3. The process of claim 2 wherein the resulting acid halide and diluent are removed from the isocyanate after the heating of the reaction mixture.

4. The process of claim 1 wherein the isocyanide dihalide is a member selected from the group consisting of 2 - chlorocyclohexyl isocyanide dichloride, 2-chloroisopropyl isocyanide dichloride, 4-chlorobuten-2-yl isocyanide dichloride, 2,4-dichlorophenyl isocyanide dichloride, 1-chloromethylpropyl isocyanide dichloride, phenylene-bis-isocyanide dichloride and phenyl isocyanide difluoride.

References Cited

Xühle et al.: Angew. Chemie International ed., vol. 4, p. 983, (1965).

CHARLES B. PARKER, Primary Examiner

D. H. TORRENCE, Assistant Examiner

U.S. Cl. X.R.

260—566 D